M. W. MIX.
KNOCKDOWN AIRPLANE FUSELAGE AND PROCESS THEREFOR.
APPLICATION FILED APR. 8, 1918.
1,354,677.
Patented Oct. 5, 1920.
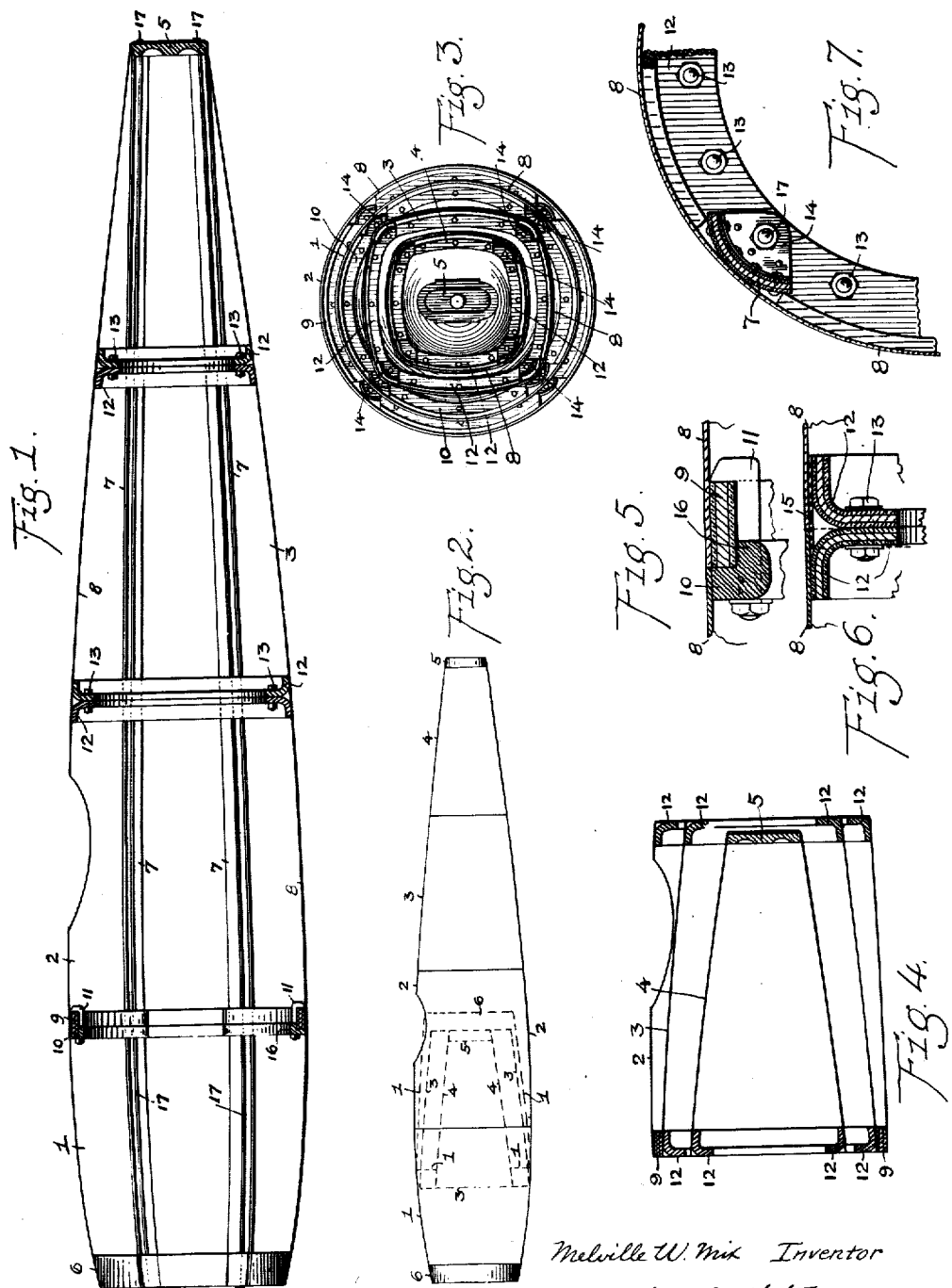
Melville W. Mix Inventor
By N. S. Amstutz Attorney

UNITED STATES PATENT OFFICE.

MELVILLE W. MIX, OF MISHAWAKA, INDIANA.

KNOCKDOWN AIRPLANE-FUSELAGE AND PROCESS THEREFOR.

1,354,677.　　　Specification of Letters Patent.　　　Patented Oct. 5, 1920.

Application filed April 8, 1918. Serial No. 227,314.

*To all whom it may concern:*

Be it known that I, MELVILLE W. MIX, citizen of the United States, residing at Mishawaka, in the county of St. Joseph and State of Indiana, have invented certain new and useful Improvements in Knockdown Airplane-Fuselages and Processes Therefor, of which the following is a specification.

My invention relates to improvements in "knock-down" airplane fuselages and process therefor and it more especially consists of the features pointed out in the annexed claims.

The purpose of my invention is to provide a sectional fuselage that may be nested for transportation purposes, in order to facilitate its packing and enable the maximum number of machines to be carried overseas or otherwise in the least possible space, so as to largely increase the number of airplanes transported without adding to the tonnage capacity available; that provides a fuselage formed of sections, with continuous longérons, and separate bulk heads, the assembled parts forming a "monocoque" type of construction which is sheathed with plywood or laminated veneer; that provides an airplane body which is exceedingly strong and very light and specially adaptable in the construction of the swiftest and ultra modern types of machines; and that lends itself to rapid and efficient manufacture in ample quantities to meet the urgent exigencies of military requirements.

With these and other related ends in view I illustrate in the accompanying drawing such instances of adaptation as will disclose the broad underlying principle without limiting myself to the specific details of adaptation shown as suggested exemplifications of various constructional expedients.

Figure 1 instances in diagrammatic relation an assembled fuselage.

Fig. 2 shows in reduced scale a four member fuselage showing in dotted lines how four sections may be nested together for shipment.

Fig. 3 is an end elevation of Fig. 2.

Fig. 4 shows three members nested for shipment.

Fig. 5 instances a method of fastening adjacent members to each other.

Fig. 6 instances another fastening expedient.

Fig. 7 is a transverse section instancing the relation of a longéron to the other parts.

In practically carrying out my invention I may employ any desired form of fastening expedient for holding the separate divisions of the fuselage together to form a complete airplane body. I may form the body into any desired number of divisions as the exigencies of various circumstances demand for which reasons I do not in any sense limit myself to the specific expedients shown and described but lay claim to the broadest interpretation of all alternatives of construction and adaptation.

In addition to the use of bolts, etc., for fastening the divisions together I employ continuous longérons reaching from the head to the tail post in an unbroken length being secured to each division by means of brackets, screws, nails, or any other approved method of fastening. This binds the several divisions together into a rigid and extremely serviceable whole for use with any desired type of wings, supporting struts, spars, etc., regardless of the kind of material used.

The fuselage may be divided into four or any other number of divisions. In Fig. 1 there is an engine division or section 1, a cock pit division 2, a mid-section 3, and a tail section 4. The latter has a tail or stern post 5 and the engine section a stem or head member 6. The several sections are held together by any desired expedient, for instance hook bolts 11 can be used with flat bulk head frames 9 and ring frames 10 when it is desirable to encroach on the inside dimensions as little as possible. The ring frame 10 Fig. 5 may have an alining flange 16 to insure the perfect meeting of adjacent division ends. When it is not so important to keep the inside clear dimension as large as possible the bulk head frames 12 may be made of plywood pressed into angular shape as instanced in Fig. 6 in which case adjacent frames are held together by through bolts 13. Wherever this type of frame is used an alining plate 15 bent to conform to the external cross sectional shape of the fuselage may be placed between a frame and the cover 8 so as to pass inside of the projecting end of the cover of an adjacent division, thus also insuring a perfect junction of the meeting edges of the several divisions. The bulk head frames 10 or 12 may have thin angle plates 14 by which they can be secured to each of the longérons 7. The external contour of these frames, as well as frame 9 will of course be adapted to whatever cross sectional form the longérons 7 may possess.

The method involved in this invention comprises a proper proportioning of the fuselage divisions with respect to each other so that they will readily "nest" into each other when disassembled. In this way a relatively short box may contain an entire fuselage, eliminating transportation breakages and reducing the shipping space to a minimum. Fig. 1 instances a fuselage of standard "stream-line" form which has been approved in actual flight conditions because it gives the minimum resistance to movement through the air thus securing an airplane body that is especially amenable to accepted aero-dynamic formulæ and one that will give the results demanded by swift scouting machines.

Whenever the engine section 1 is packed separately with the engine then only three sections would be "nested" for shipment as shown in Fig. 4. The several divisions in cross section may be of any desired shape, circular, rectangular, octagonal, etc. Each division is quite self-contained forming an independent unit. Section 1 may permanently contain the engine which in any event if not so assembled must be boxed separately. Section 2 is used for the pilot's compartment and may be called the cock pit section. The middle section 3 may be closed over or a second cock pit formed in it for an observer in case the machine is to be a two-seater, while the tail section 4 ends in the stern post 5 to which the rear controls, stabilizers, and rudders are attached.

The several sections are provided with bulk head frames at each end as heretofore described. These frames may be made of laminated plywood as shown. They may be flanged to form a circular angle ring to which the thinner plywood covering 8 is attached and by means of which the sections are secured to each other.

The several sections are of different mean diameters. Each section is more or less tapering and the openings of the bulk head frames are sufficiently large so that the small end of an adjacent receding section will pass through. In this way the middle section 3 will rest within the cock pit section 2 and the tail section inside of the latter. If for any reason the engine section 1 is also to be nested with the others, in case the manufacture and assembling of the engine is done at a different point than where the fuselage is built then the front or small end of this section might pass into the cock pit section 2 so as to project therefrom, section 3 inside of it and section 4 inside of the latter. I do not however limit myself to the use of three, four or any other number of nesting sections. It is of course self-evident that an extraordinary economy in shipping space is secured by this "knock-down" type of monocoque fuselage.

As heretofore stated the longérons 7 are continuous because it is most desirable that they be unbroken and firmly attached to the front end of the engine section and tail post, extending throughout the length of the whole body, thus forming an extremely strong and yet light fuselage. The longérons in length being about the same as the wing spars may be drawn out entire from their seats in the sections and packed with the wings or in long separate boxes. In assembling the fuselage the different sections will be simply slipped onto the longérons, the plates 14 fastened and bolts 11 and 13 secured, and the ends of the longérons attached to the stem and stern and the whole becomes a finished integral body unit. In order that all the sections may be additionally held together tie rods 17 may pass inside of each longéron so as to most securely hold all the divisions under end compression. Such rods would be fastened in the head piece and stern post by nuts, etc., in any well known manner, not shown in detail in the drawings but indicated in Fig. 1.

It is understood that I do not limit myself to the use of plywood in the formation of the bulk head frames but other materials may be used, such as metal or ordinary unlaminated wood.

It is quite obvious that a unique and valuable advance has been made in fuselage construction. An advance that the uncertainties of war time transportation and the restricted space available at the most critical times most urgently demand. The invention is of commanding importance and is destined to facilitate the rapid production, transport and assemblage of such needed air craft for defense, offense and general utilitarian, industrial and commercial purposes.

What I claim is,

1. In airplane fuselages, a body comprising separate attachable and detachable units adapted to be nested into each other when disassembled, means for holding the sections to each other when assembled, continuous longérons extending from end to end of a group of units, means for attaching the same to the units, and separate tie rods for each longéron said rods being secured to the extreme ends of the fuselage.

2. In airplane fuselages, a body formed of separate independently constructed units adapted to be assembled end to end in coordinate relation to each other, continuous longérons reaching from end to end of the fuselage and independent means for attaching the same to the several ends of the independent units so as to hold the parts against accidental displacement under service conditions.

3. An article of manufacture comprising a fuselage consisting of separate assemblable sections whose ends admit of coördinate attachment to each other in related pairs, means for separately securing such sections to each other, a plurality of continuous longitudinal members extending from end to end of a group of sections, and means for separately attaching said members to said sections.

4. An article of manufacture comprising a "knock-down" type of fuselage, consisting of a plurality of independent sections having different mean cross sectional dimensions, which are assembled with ends of the same dimensions adjacent each other, means for rigidly fastening them to each other, so as to distribute the stresses to which the fuselage is subjected among lengthwise continuous supports which engage all the sections.

5. An article of manufacture comprising a "knock-down" type of fuselage, consisting of a plurality of separate sections having different average cross sectional dimensions which are assembled with ends of the same dimensions engaging each other, means for separately fastening such adjacent ends to each other, and a series of separate reinforcements, extending from end to end of a group of sections said sections being independently attached to such reinforcements.

6. An article of manufacture comprising a fuselage structure consisting of a body formed of separate sections, means for attaching intermediate related sections to each other, and independent means for additionally supporting the same between the extreme end sections said sections being adapted so as to be disconnected from each other, in order that a desired number of the separate sections may be nested into each other for shipment.

7. In airplane fuselages, a body composed of separable units having open ends of varying mean diameters, means for assembling them end to end in related order to form a complete structure, continuous longérons and tie rods for holding the parts together, being adapted for reassembling within each other as a disassembled structure for shipment.

8. An article of manufacture, comprising a sectional airplane body of detachable units having different end dimensions assembled together with related ends in engagement with each other, means for alining such ends into registration, and means for detachably securing the units to each other.

9. The method of airplane fuselage construction consisting in forming separate units having different dimensioned ends, in assembling related ends in engagement with each other, in attachably and detachably using such units, in nesting disassembled units into each other for shipment and in subjecting groups of assembled units to an over-all compression at a plurality of points.

In testimony whereof I affix my signature.

MELVILLE W. MIX.